United States Patent
Kim

(10) Patent No.: US 11,358,460 B2
(45) Date of Patent: Jun. 14, 2022

(54) ENGINE MOUNT FOR VEHICLE

(71) Applicants: Hyundai Motor Company, Seoul (KR); Kia Motors Corporation, Seoul (KR)

(72) Inventor: Seung Won Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/940,657

(22) Filed: Jul. 28, 2020

(65) Prior Publication Data

US 2021/0300169 A1    Sep. 30, 2021

(30) Foreign Application Priority Data

Mar. 31, 2020    (KR) .......................... 10-2020-0038708

(51) Int. Cl.
*B60K 5/12*    (2006.01)

(52) U.S. Cl.
CPC .......... *B60K 5/1208* (2013.01); *B60K 5/1283* (2013.01)

(58) Field of Classification Search
CPC ...... B60K 5/12; B60K 5/1275; B60K 5/1283; B60K 5/1291; F16F 9/066; F16F 9/14; F16F 13/002
See application file for complete search history.

(56) References Cited

U.S. PATENT DOCUMENTS

| | | | | |
|---|---|---|---|---|
| 4,693,455 A | * | 9/1987 | Andra ................... | F16F 13/264 188/379 |
| 4,711,206 A | * | 12/1987 | Andra ..................... | F16F 13/22 248/636 |
| 5,102,105 A | * | 4/1992 | Hamaekers ............. | F16F 13/18 180/902 |
| 5,215,293 A | * | 6/1993 | Muramatsu ............. | F16F 13/10 267/122 |
| 5,443,574 A | * | 8/1995 | Ohtake ................. | F16F 13/262 267/140.14 |
| 5,501,433 A | * | 3/1996 | Satori ................... | F16F 13/106 248/636 |
| 5,927,699 A | * | 7/1999 | Nakajima ............... | F16F 13/14 267/140.14 |

(Continued)

FOREIGN PATENT DOCUMENTS

DE    10 2009 003 809 A1    10/2010
KR    10-1676257 B1    11/2016

*Primary Examiner* — Jeffrey J Restifo
(74) *Attorney, Agent, or Firm* — Fox Rothschild LLP; Peter F. Corless

(57) ABSTRACT

An engine mount for a vehicle is provided to include a core bush coupled to a vehicle body, a main rubber formed on the core bush, and an outer pipe that is attached to the main rubber and extends downwards. An orifice body is mounted in the outer pipe and has a main flow path and an upper plate is coupled to the orifice body. The upper plate has a fluid passage aperture to communicate with the main flow path and has a plurality of fluid action apertures. An integral plate includes a membrane part disposed under the upper plate and a diaphragm part coupled to an edge of a lower surface of the orifice body under the orifice body. A lower cover body includes a membrane support plate that has an air aperture and is disposed under the membrane part and a cover supporting the diaphragm part.

12 Claims, 12 Drawing Sheets

(56) References Cited

U.S. PATENT DOCUMENTS

| | | | | |
|---|---|---|---|---|
| 6,443,438 | B2 * | 9/2002 | Satori | F16F 13/105 267/140.13 |
| 6,454,249 | B1 * | 9/2002 | Childers | F16F 13/262 267/140.14 |
| 6,543,756 | B2 * | 4/2003 | Ihara | F16F 13/103 180/291 |
| 6,619,636 | B2 * | 9/2003 | Yamamoto | F16F 13/101 267/140.13 |
| 7,040,607 | B2 * | 5/2006 | Grassmuck | F16F 13/106 267/140.13 |
| 7,334,783 | B2 * | 2/2008 | Yoneyama | F16F 13/105 267/140.13 |
| 7,802,777 | B2 * | 9/2010 | Katayama | F16F 13/107 267/140.13 |
| 8,356,806 | B2 * | 1/2013 | Garety | F16F 13/108 267/140.13 |
| 8,594,911 | B2 * | 11/2013 | Okamoto | F16F 13/264 701/111 |
| 8,657,269 | B2 * | 2/2014 | Nishi | F16F 13/101 267/140.12 |
| 8,714,530 | B2 * | 5/2014 | Kanaya | F16F 13/106 267/140.13 |
| 8,783,668 | B2 * | 7/2014 | Ishikawa | F16F 13/106 267/140.13 |
| 8,960,631 | B2 * | 2/2015 | Kato | F16F 13/102 248/560 |
| 8,998,186 | B2 * | 4/2015 | Kim | F16F 13/105 267/140.13 |
| 9,033,319 | B2 * | 5/2015 | Kim | F16F 13/105 267/140.14 |
| 9,574,636 | B2 * | 2/2017 | Kim | F16F 13/10 |
| 9,605,727 | B2 * | 3/2017 | Kim | F16F 13/26 |
| 9,676,264 | B2 * | 6/2017 | Kim | B60K 5/1208 |
| 9,713,954 | B2 * | 7/2017 | Kim | F16F 13/002 |
| 9,987,915 | B1 * | 6/2018 | Yoon | B60K 5/1208 |
| 10,029,553 | B2 * | 7/2018 | Jo | F16F 9/3207 |
| 10,077,820 | B2 * | 9/2018 | Kim | F16F 13/26 |
| 10,180,173 | B2 * | 1/2019 | Kim | F16F 13/10 |
| 10,215,253 | B2 * | 2/2019 | Kim | F16F 13/106 |
| 10,293,672 | B2 * | 5/2019 | Kim | B60K 5/1291 |
| 10,295,010 | B2 * | 5/2019 | N | B60K 5/1266 |
| 10,336,175 | B2 * | 7/2019 | Yoon | B60K 5/1208 |
| 10,352,395 | B2 * | 7/2019 | Yasuda | F16F 13/26 |
| 10,406,904 | B2 * | 9/2019 | Kim | F16F 13/105 |
| 10,406,906 | B2 * | 9/2019 | Yoon | F16F 13/262 |
| 10,427,514 | B2 * | 10/2019 | Kim | B60K 5/12 |
| 10,436,281 | B2 * | 10/2019 | Kim | F16F 13/105 |
| 10,508,707 | B2 * | 12/2019 | Vollmann | F16F 13/106 |
| 10,520,057 | B2 * | 12/2019 | Kim | B60K 5/1225 |
| 10,538,154 | B2 * | 1/2020 | Kim | F16F 13/10 |
| 10,549,621 | B2 * | 2/2020 | Yun | F16F 13/10 |
| 10,618,397 | B2 * | 4/2020 | Kim | F16F 13/103 |
| 10,619,697 | B2 * | 4/2020 | Han | F16F 13/10 |
| 10,744,864 | B2 * | 8/2020 | Choi | B60K 5/1283 |
| 10,753,422 | B2 * | 8/2020 | Raida | B60K 5/1283 |
| 10,773,584 | B2 * | 9/2020 | Kim | F16F 13/103 |
| 10,899,216 | B2 * | 1/2021 | Kim | H02K 7/1876 |
| 2017/0152911 | A1 * | 6/2017 | Kim | B60K 5/1208 |

* cited by examiner

ENGINE MOUNT FOR VEHICLE

CROSS-REFERENCE TO RELATED APPLICATION

This application claims under 35 U.S.C. § 119(a) the benefit of priority to Korean Patent Application No. 10-2020-0038708 filed on Mar. 31, 2020, the entire contents of which are incorporated herein by reference.

BACKGROUND

(a) Technical Field

The present disclosure relates to an engine mount for a vehicle and more particularly, to an engine mount for a vehicle in which a membrane and a diaphragm are integrally formed with each other to reduce manufacturing costs and weight and to enable the dynamic characteristics of the engine mount to be switched in a self-switchable manner.

(b) Background Art

Generally, to efficiently reduce vibration and noise transmitted to a vehicle body when an engine and a powertrain including a transmission are mounted in an engine room, the engine and the powertrain are mounted via an engine mount. Engine mounts are classified into a fluid engine mount sealably containing fluid therein, a negative-pressure-type semi-active engine mount, an electronic semi-active engine mount and the like, and may be constructed into various structures other than the above-listed engine mounts.

The engine mount supports a powertrain in an engine room of a vehicle, isolates vibrations generated by the powertrain and controls the behavior of the powertrain during operation of the vehicle. With regard to the dynamic characteristic and the damping value of the engine mount, it is advantageous to lower the dynamic characteristic at a C2 frequency (generally, at a frequency of about 30-50 Hz) for isolation of vibration of the powertrain during idling, and it is advantageous to increase the damping value at 8-15 Hz for control of behavior of the powertrain during traveling.

Accordingly, a negative-pressure semi-active engine mount or an electronic semi-active mount is adopted as the engine mount for supporting the powertrain. For reference, "negative-pressure semi-active engine mount" refers to a fluid engine mount that adopts a negative-pressure driver that is turned on or off depending on the traveling conditions to vary the dynamic characteristic, and the electronic semi-active engine mount refers to an engine mount, which is a fluid engine mount adopting an electronic driver which is turned on or off depending on the traveling conditions to vary the dynamic characteristic.

Although the semi-active engine mount advantageously switches between two types of dynamic characteristics depending on the traveling condition, the manufacturing costs and weight thereof are increased since the negative-pressure driver or the electronic driver must be added. In addition, since a separate membrane for isolating an upper fluid chamber from a lower fluid chamber is mounted on the orifice body mounted in the fluid engine mount or the semi-active engine mount and a separate diaphragm for defining the lower fluid chamber is mounted on the lower portion of the orifice body, the number of components and labor increase, thereby increasing manufacturing costs.

The above information disclosed in this section is merely for enhancement of understanding of the background of the disclosure and therefore it may contain information that does not form the prior art that is already known in this country to a person of ordinary skill in the art.

SUMMARY

The present disclosure provides an engine mount for a vehicle in which a membrane and a diaphragm, which are essential components of the engine mount for supporting the powertrain of the vehicle, are integrally formed with each other to reduce in manufacturing cost, weight and labor and to enable a dynamic characteristic of the engine mount to be switched in a self-switchable manner.

In one aspect, the present disclosure provides an engine mount for a vehicle having a core bush to be assembled with a vehicle body, a main rubber formed on an outer surface of the core bush, an outer pipe attached to an outer surface of the main rubber and extending downwards, an orifice body mounted on an inner surface of the outer pipe and having a main flow path for communication of fluid between an upper fluid chamber and a lower fluid chamber, an upper plate coupled to an upper portion of the orifice body, the upper plate having a fluid passage aperture formed in an outer peripheral portion thereof to communicate with the main flow path and having a plurality of fluid action apertures formed in a center region thereof, an integral plate including a membrane part disposed under the center region of the upper plate to be displaced vertically, and a diaphragm part coupled to an edge of a lower surface of the orifice body to be positioned under the orifice body and integrally formed with the membrane part, and a lower cover body including a membrane support plate having an air aperture formed therethrough and disposed under the membrane part to be spaced apart therefrom, and a cover supporting a lower portion of the diaphragm part and integrally formed with the membrane support plate.

In an exemplary embodiment, the upper fluid chamber may be defined as a space between the main rubber and the upper plate, and the lower fluid chamber may be defined as a space between the orifice body and the diaphragm part. In addition, a space between an upper surface of the membrane part of the integral plate and a lower surface of the upper plate may serve as a fluid chamber, into which fluid in the upper fluid chamber may be introduced and from which the fluid may be discharged to the upper fluid chamber, and a space between a lower surface of the membrane part and an upper surface of the membrane support plate of the lower cover body may provide an air chamber, into which external air may be introduced and from which the external air may be discharged to an outside.

The fluid action aperture may include a first circular fluid action aperture, formed in a center of the upper plate, and a plurality of second fluid action apertures, which are radially arranged around the first fluid action aperture. The integral plate may be integrally provided at upper and lower surfaces of a center thereof with an upper projecting end and a lower projecting end, respectively, to limit a vertical displacement of the membrane part.

Further, the upper projecting end may be fitted into the first fluid action aperture in the upper plate to close the first fluid action aperture when the membrane part is displaced upwards, and the lower projecting end may be fitted into the air aperture in the membrane support plate of the lower cover body to close the air aperture when the membrane part is displaced downwards. In addition, each of the upper projecting end and the first fluid action aperture may have a trapezoidal cross section that gradually decreases upwards, and each of the lower projecting end and the air aperture may have a trapezoidal cross section that gradually decreases downwards.

The membrane support plate of the lower cover body may be disposed at an edge of an upper surface thereof with a sealing end, which is in sealable contact with an edge of a lower surface of the membrane part to prevent leakage of fluid. In addition, the orifice body may have a coupling groove formed in a lower portion thereof, and the diaphragm part of the integral plate may have a coupling protrusion formed at a peripheral portion thereof, which is closely fitted into the coupling groove.

The peripheral portion of the diaphragm part may be disposed at an outer surface thereof with a rigidity-reinforcing plate attached thereto to reinforce the rigidity of the diaphragm part. In addition, the air aperture formed in the membrane support plate of the lower cover body may be a female threaded aperture, and a hollow screw for adjusting a vertical displacement of the membrane part may be threadedly coupled to the female threaded aperture. A dynamic characteristic of the membrane part may be tuned by increasing or decreasing the size of the aperture in the hollow screw. The engine mount may further include a solenoid valve disposed in a space defined by the membrane support plate of the lower cover body and the cover to open and close the air aperture.

BRIEF DESCRIPTION OF THE DRAWINGS

The above and other features of the present disclosure will now be described in detail with reference to exemplary embodiments thereof, illustrated in the accompanying drawings which are given hereinbelow by way of illustration only, and thus are not limitative of the present disclosure, and wherein.

Figure 1:
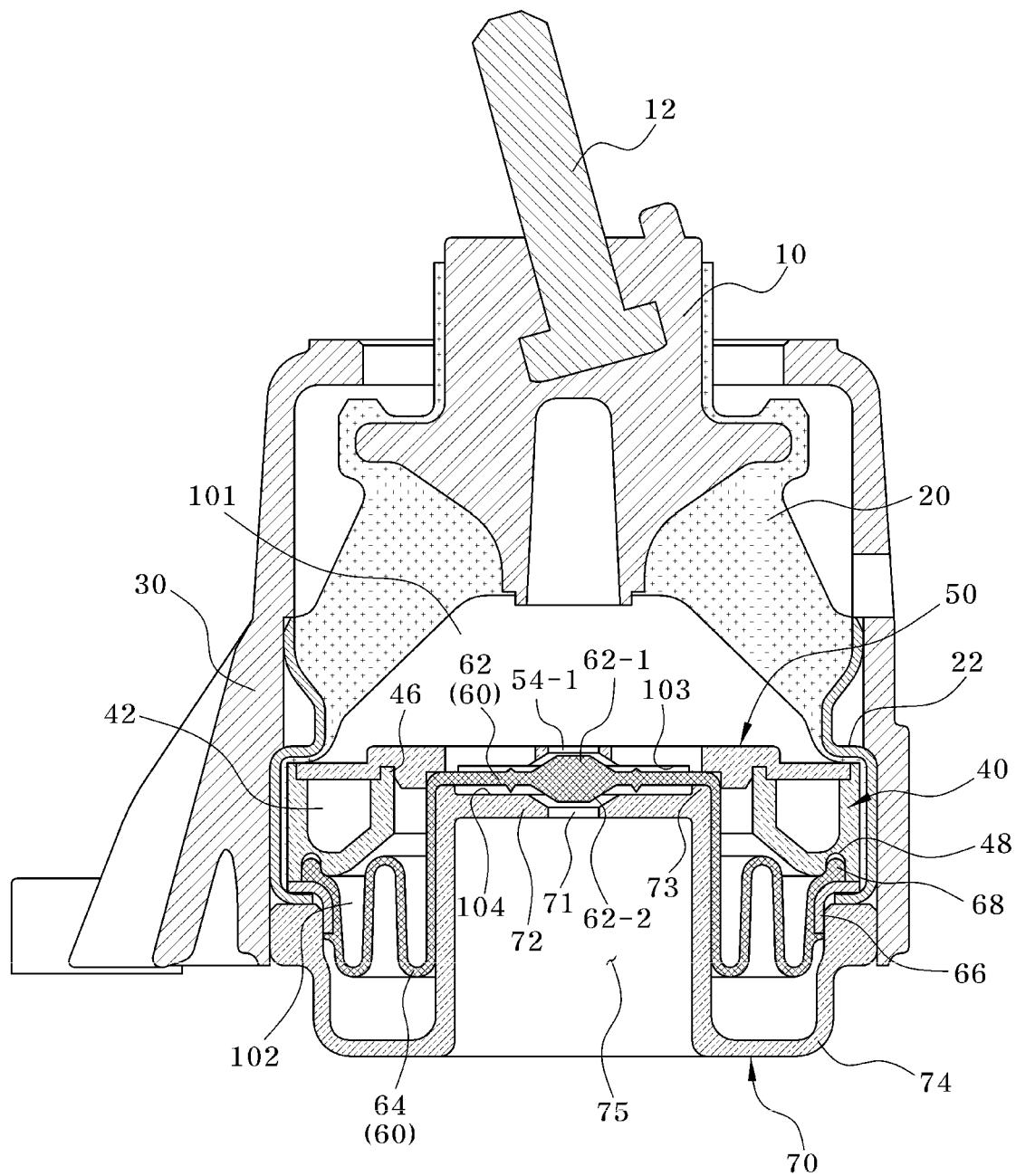
FIG. 1 is a cross-sectional view illustrating an engine mount according to an exemplary embodiment of the present disclosure.

Reference numerals set forth in the Drawings includes reference to the following elements as further discussed below:

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, a preferred embodiment of the present disclosure will be described in detail with reference to the accompanying drawings.

Figure 2:
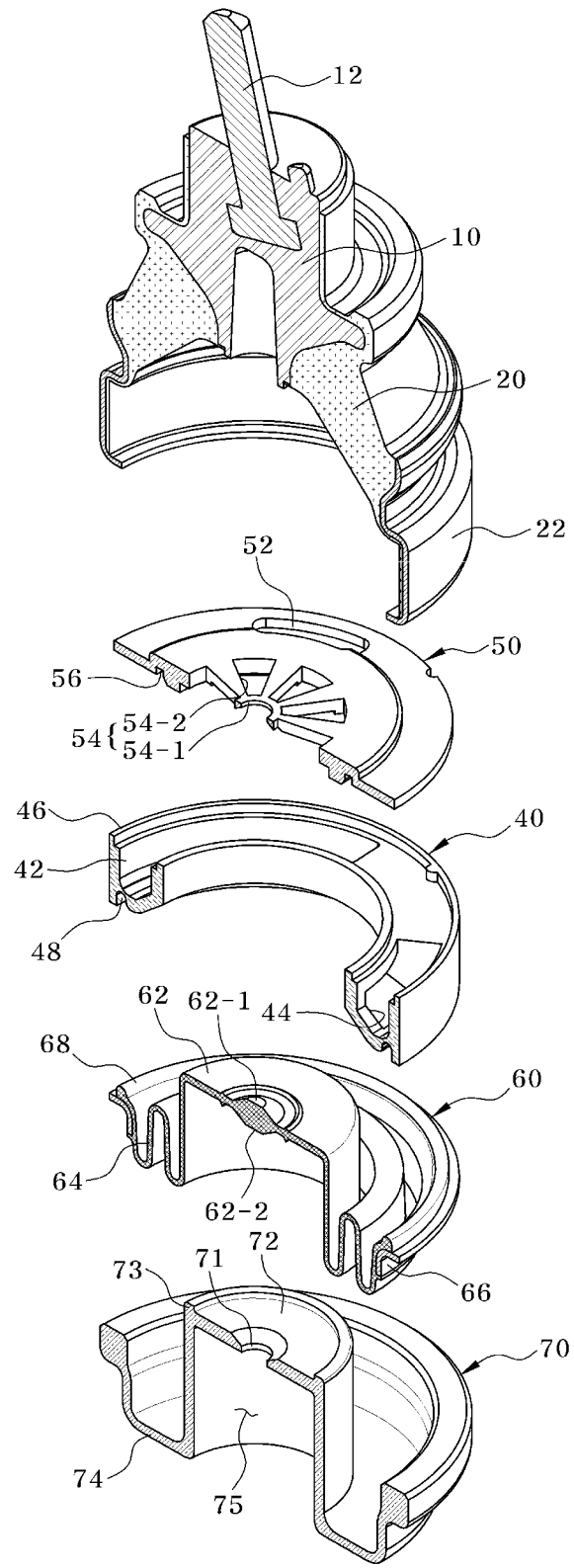
FIG. 2 is an exploded perspective view illustrating the engine mount according to the exemplary embodiment of the present disclosure.
Figure 3A:
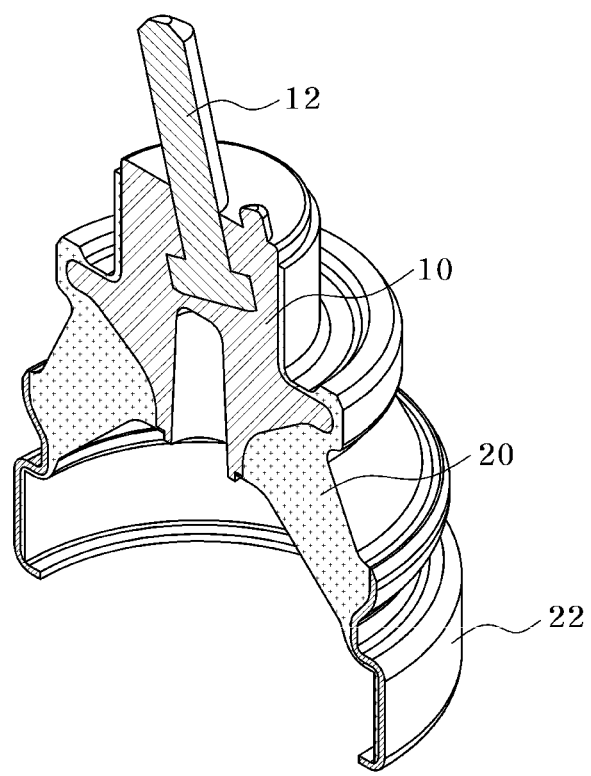
FIGS. 3A to 3D are cross-sectional and perspective views illustrating an assembly process of the engine mount according to the exemplary embodiment of the present disclosure.
Figure 3B:
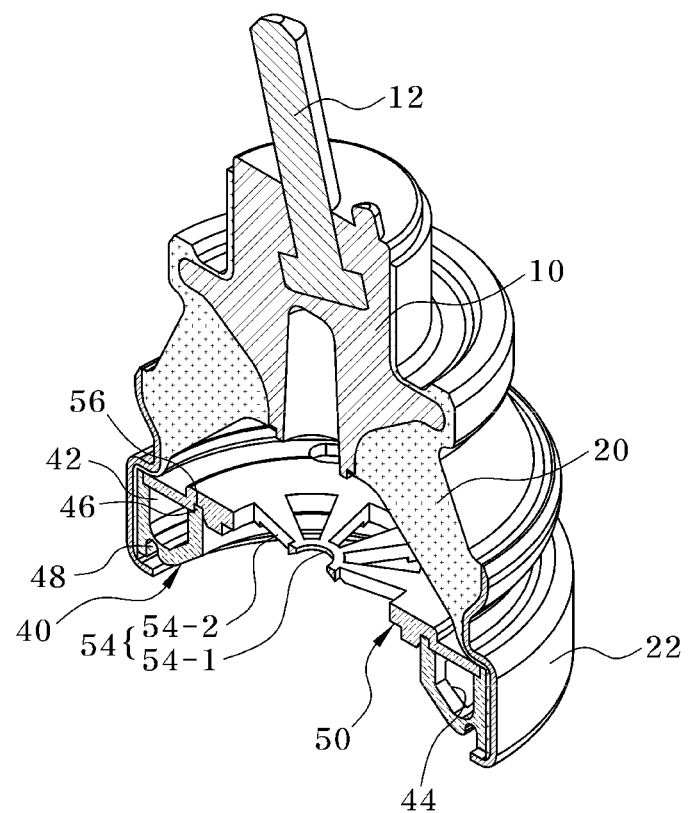
Figure 3C:
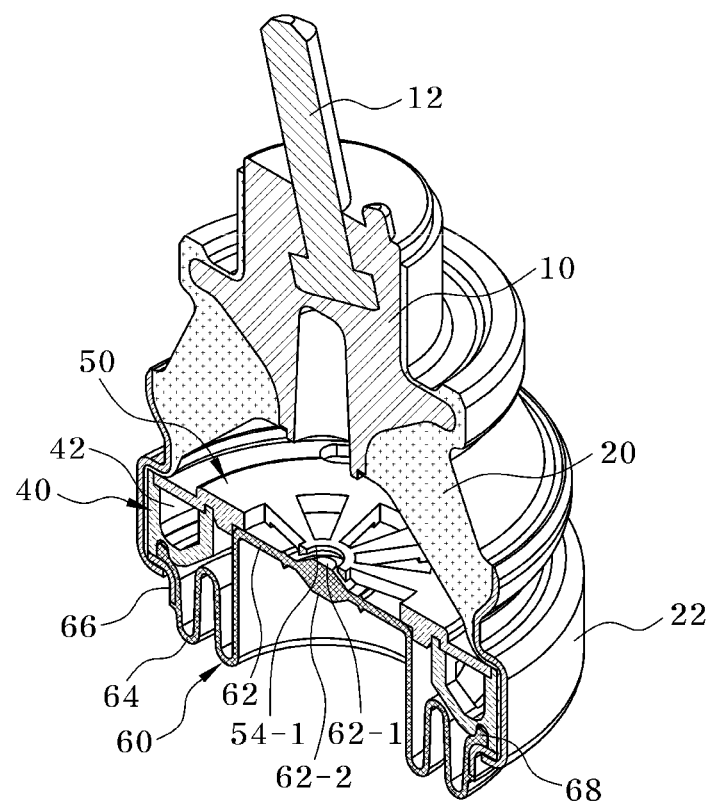
Figure 3D:
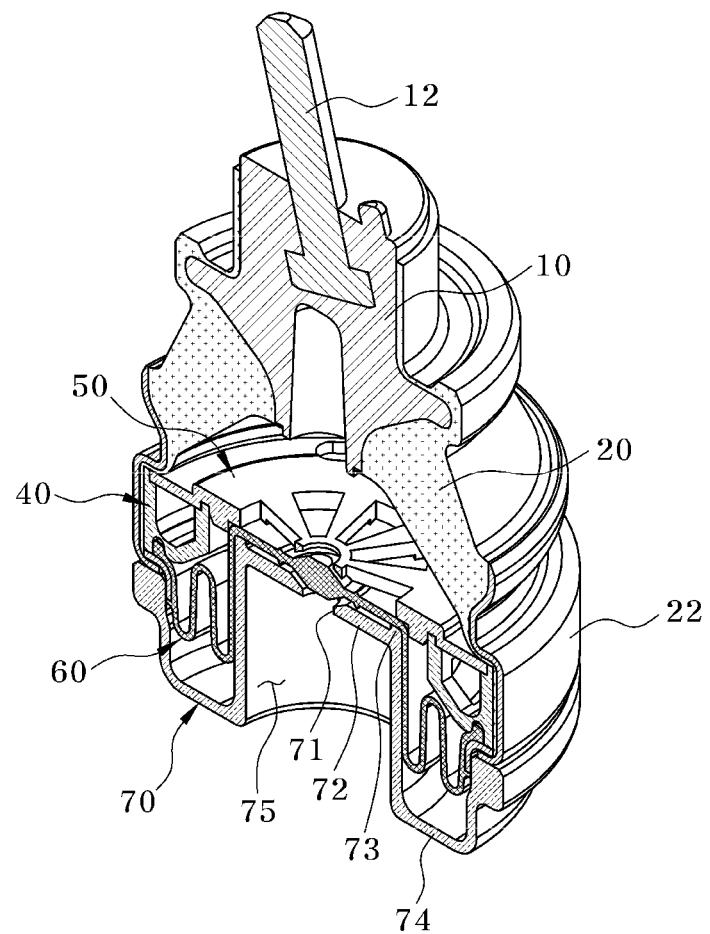

FIG. 1 is a cross-sectional view illustrating an engine mount according to an embodiment of the present disclosure. FIG. 2 is an exploded perspective view illustrating the engine mount according to the exemplary embodiment of the present disclosure. FIGS. 3A to 3D are cross-sectional and perspective views illustrating an assembly process of the engine mount according to the exemplary embodiment of the present disclosure. In the drawings, reference numeral "10" indicates a core bush.

A bolt 12 may be coupled to the core bush 10 for coupling to a vehicle body, and the core bush 10 may be provided on the outer peripheral portion thereof with a main rubber 20 through curing adhesion or the like for absorption of vibration. An outer metal pipe 22 may be attached to the outer surface of the main rubber 20 through curing adhesion. The outer pipe 22 may extend downwards to provide a mounting space for an orifice body 40. Accordingly, the orifice body 40 with an upper plate 50 coupled to the upper portion thereof may be mounted in the outer pipe 22.

The orifice body 40, having a circular ring shape, is circumferentially provided with a main flow path 42 for fluid communication between an upper fluid chamber 101 and a lower fluid chamber 102. The orifice body 40 may be disposed at a predetermined location on the bottom surface thereof with a communication aperture 44, which communicates with the lower fluid chamber 102. The orifice body 40 may be mounted to the inner surface of the outer pipe 22.

An upper plate 50 may be disposed on the orifice body 40 and may be coupled thereto. The upper plate 50, having a circular plate shape, may be disposed in the outer peripheral portion thereof with one fluid passage aperture 52, which communicates with the main flow path 42 in the orifice body 40. Furthermore, the upper plate 50 may be disposed in the central region thereof with a plurality of fluid action holes 54, and disposed on the orifice body 40 and coupled thereto. In particular, the upper plate 50 may be coupled to the orifice body 40 in a manner such that a coupling protrusion 46 formed on the upper end of the orifice body 40 is fitted into a coupling groove 56 circumferentially formed in the bottom portion of the upper plate 50.

The fluid action apertures 54 in the upper plate 50 may include a first fluid action aperture 54-1, formed in the center of the upper plate 50, and a plurality of second fluid action apertures 54-2, radially formed through the outer peripheral portion of the upper plate 50 around the first fluid action aperture 54-1. An integral plate 60, which is made of rubber, may be disposed under the orifice body 40 and the upper plate 50 to be spaced apart therefrom. The integral plate 60 may be integrally provided with a membrane part 62 and a diaphragm part 64.

More specifically, the integral plate 60 may include the membrane part 62, disposed under the center region of the upper plate 50 with a predetermined distance there between to be movable in an up-and-down direction, and the diaphragm part 64, which extends downwards from the peripheral edge of the membrane part 62 and then extends horizontally while defining a corrugation to be positioned under the orifice body 40 with a predetermined distance there between.

In particular, the orifice body 40 may be disposed in the peripheral portion of the bottom surface thereof with a coupling groove 48, and the diaphragm part 64 of the integral plate 60 may be disposed at the peripheral portion thereof with a coupling protrusion 68, which extends upwards. Accordingly, the diaphragm part 64 may be secured to the orifice body 40 by fitting the coupling protrusion 68 into the coupling groove 48. Since the diaphragm part 64 may have a corrugated shape, there is a need to reinforce the rigidity required to maintain the corrugated shape. Accordingly, a rigidity-reinforcing metal plate 66 may be attached to the outer peripheral surface of the diaphragm part 64 to reinforce the rigidity of the diaphragm part 64.

As a result, the space between the lower surface of the main rubber 20 and the upper surface of the upper plate 50 may be defined as the upper fluid chamber 101, and the space between the lower surface of the orifice body 40 and the upper surface of the diaphragm part 64 of the integral plate 60 may be defined as the lower fluid chamber 102. Consequently, the fluid in the upper fluid chamber 101 may move to the lower fluid chamber 102 through the fluid passage aperture 51 in the upper plate 50, followed by the main flow path 42 and the communication aperture 44 in the orifice body 40 in that order. Meanwhile, the fluid in the lower fluid chamber 102 may move to the upper fluid chamber 101 through the communication aperture 44 and the main flow path 41 in the orifice body 40 and then the fluid passage aperture 52 in the upper plate 50 in that order.

A cover body 70, including a membrane support plate 72 and a cover 74 integrally formed with the membrane support plate 72, may be mounted on the lower portion of the integral plate 60. The lower cover body 70 may include the membrane support plate 72, which is configured to have a plate shape having an air aperture 71 formed therethrough and which may be disposed under the membrane part 62 of the integral plate 60 to be spaced apart from the membrane part 62, and the cup-shaped cover body 74, which is integrally formed with the membrane support plate 72 and covers the lower portion of the diaphragm part 64 of the integral plate 60.

As a result, the space between the upper surface of the membrane part 62 of the integral plate 60 and the lower surface of the upper plate 50 may be defined as a fluid chamber 103 into which the fluid in the upper fluid chamber 101 is introduced and from which the fluid is discharged to the upper fluid chamber 101, and the space between the lower surface of the membrane part 62 and the upper surface of the membrane support plate 72 of the lower cover body 70 may be defined as an air chamber 104 into which external air is introduced and from which the external air is discharged.

Particularly, the membrane support plate 72 of the lower cover body 70 may be disposed at the edge of the upper surface thereof with a sealing end 73, which projects upwards to be in sealable contact with the edge of the lower surface of the membrane part 62 to prevent the fluid in the fluid chamber 103 from leaking to the outside. The membrane part 62 of the integral plate 60 may be centrally provided at the upper and lower surfaces thereof with an upper projecting end 62-1 and a lower projecting end 62-2, respectively, to limit the vertically movable displacement of the membrane part 62.

Therefore, when the membrane part 62 is maximally displaced upwards during vertical displacement thereof due to vibration or the like, the upper projecting end 62-1 may be fitted into the first fluid action aperture 54-1 in the upper plate 50, thereby closing the first fluid action aperture 54-1. Meanwhile, when the membrane part 62 is maximally displaced downwards, the lower projecting end 62-2 may be fitted into the air aperture 71 in the membrane support plate 72 of the lower cover body 70, thereby closing the air aperture 71.

Each of the upper projecting end 62-1 and the first fluid action aperture 54-1 may have a trapezoidal cross section, which gradually decreases upwards, and each of the lower projecting end 62-2 and the air aperture 71 may have a trapezoidal cross section, which gradually decreases downwards. Consequently, the upward displacement of the upper projecting end 62-1 and the downward displacement of the lower projecting end 62-2 may be constricted.

In FIG. 1, a bracket 30 may surround the engine mount and may be connected to an engine. The engine mount according to the exemplary embodiment of the present disclosure, which is constructed as described above, will now be described with regard to the operation thereof.

Figure 4:
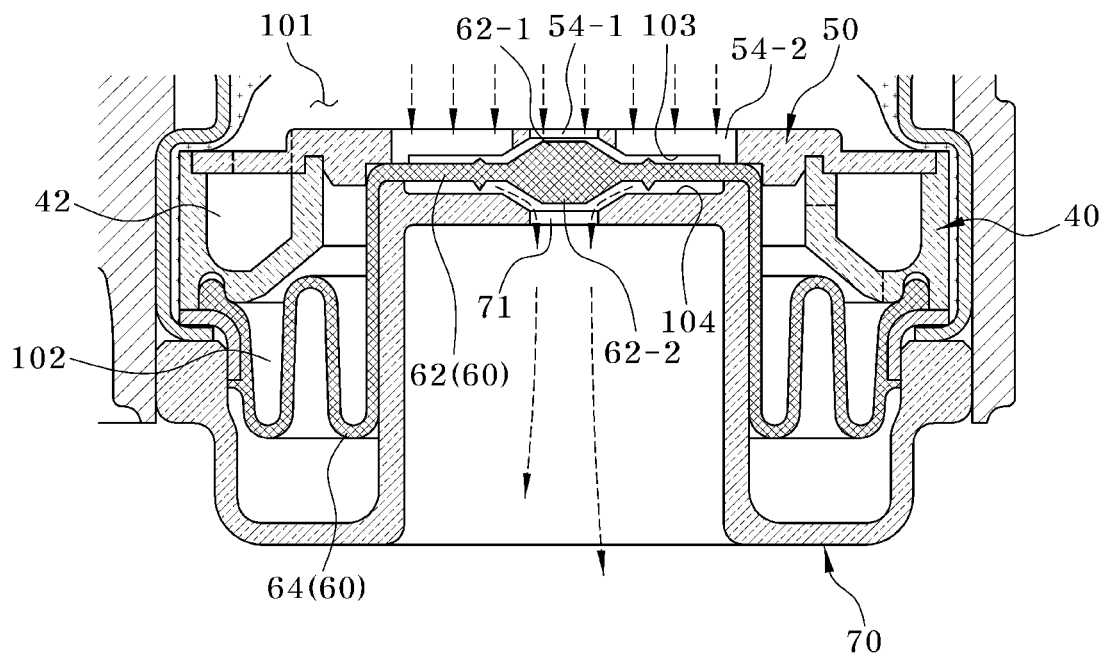
FIG. 4 is a fragmentary and enlarged cross-sectional view illustrating the operation of a membrane part of an integral plate of the engine mount according to the exemplary embodiment of the present disclosure during idling of the engine.
Figure 5:
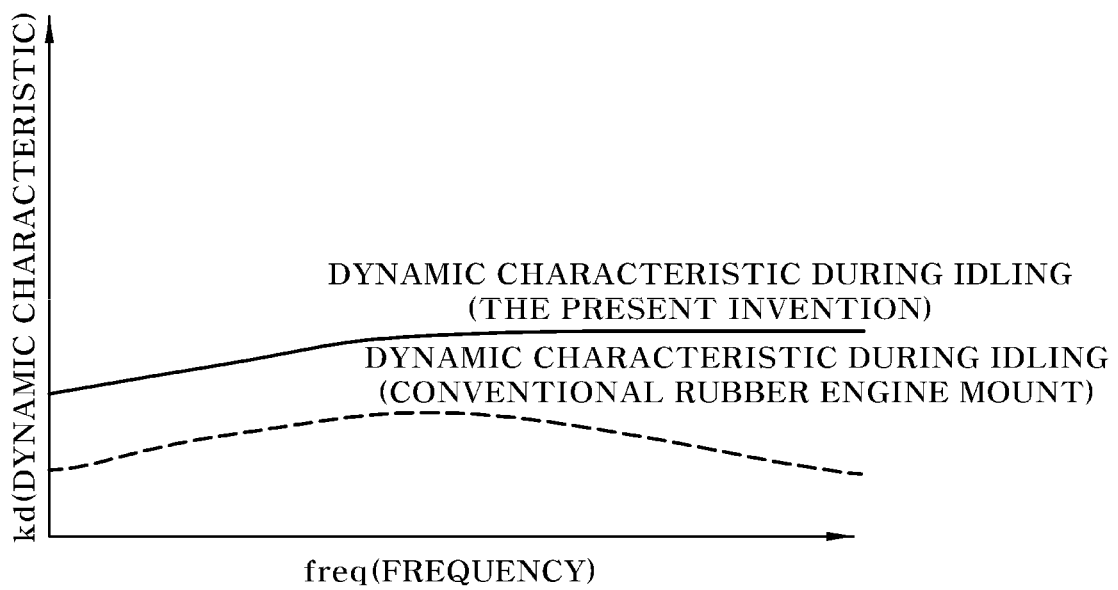
FIG. 5 is a graph illustrating the dynamic characteristic of the engine mount when the membrane part of the integral plate of the engine mount according to the exemplary embodiment of the present disclosure is operated during idling of the engine.

FIG. 4 is a fragmentary and enlarged cross-sectional view illustrating the operation of the membrane part 62 of the integral plate 60 of the engine mount according to the exemplary embodiment of the present disclosure during idling of the engine. FIG. 5 is a graph illustrating the dynamic characteristic of the engine mount when the membrane part 62 of the integral plate 60 of the engine mount according to the exemplary embodiment of the present disclosure is operated during idling of the engine.

When vibration of a vehicle during idling or micro vibration of the vehicle due to being driven on a road in good condition is applied to the engine mount, the membrane part 62 of the integral plate 60 may be displaced vertically while absorbing the micro vibration, as illustrated in FIG. 4. Since the vertical displacement of the membrane part 62 is minimal when the membrane part 62 is displaced vertically while absorbing the micro vibration, the upper projecting end 62-1 is not closely fitted into the first fluid action aperture 54-1, and additionally, the lower projecting end 62-2 is not closely fitted into the air aperture 71 in the membrane support plate 72.

Accordingly, when vibration of a vehicle during idling or micro vibration of the vehicle due to being driven on a road in good condition (e.g., even road surface) is applied to the engine mount, the fluid in the upper fluid chamber 101 may be introduced into the fluid chamber 103 through the fluid passage aperture 52 and the fluid action aperture 54 in the upper plate 50 and may act on the upper surface of the membrane part 62 of the integral plate 60, as illustrated in FIG. 4. Consequently, the membrane part 62 may be displaced downwards, and thus the air in the air chamber 104 may be discharged to the outside through the air aperture 71.

In particular, the dynamic characteristic of the engine mount according to the exemplary embodiment of the present disclosure is similar to that of a conventional rubber engine mount, as shown in the graph of FIG. 5. Since the membrane part 62 of the integral plate 60 is displaced vertically within a minute displacement range (e.g., ±1 mm or less) while absorbing vibrations during idling, there is an effect of alleviating noise, vibration and harshness (NVH).

Figure 6:
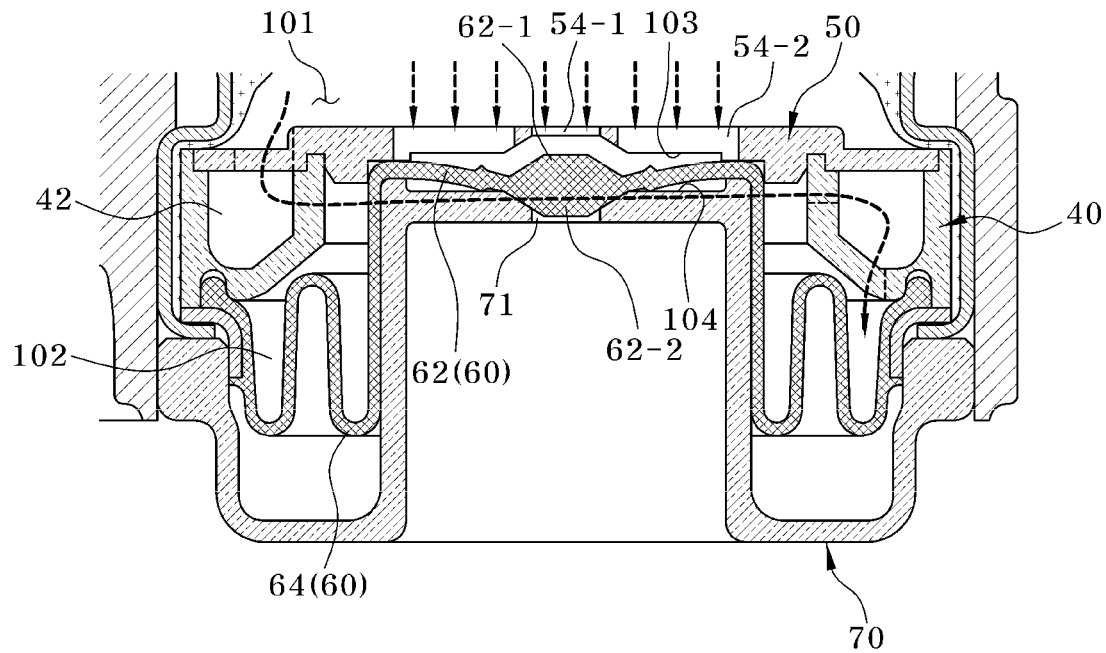
FIGS. 6 and 7 are fragmentary enlarged cross-sectional views illustrating the damping operation of the engine mount according to the exemplary embodiment of the present disclosure during traveling.
Figure 7:
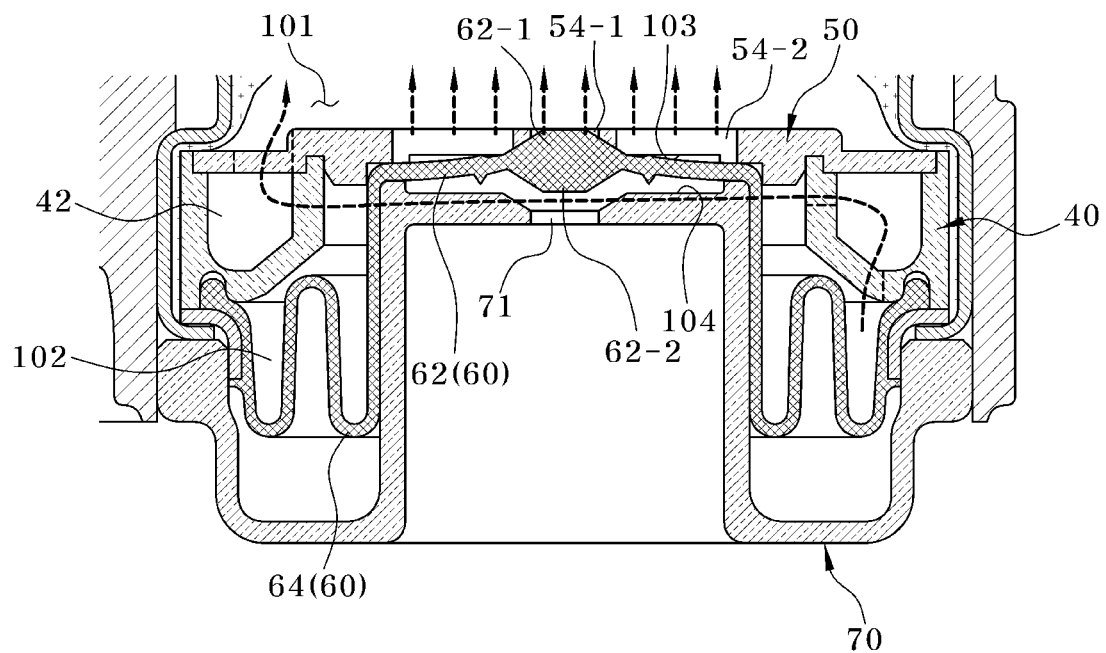
Figure 8:
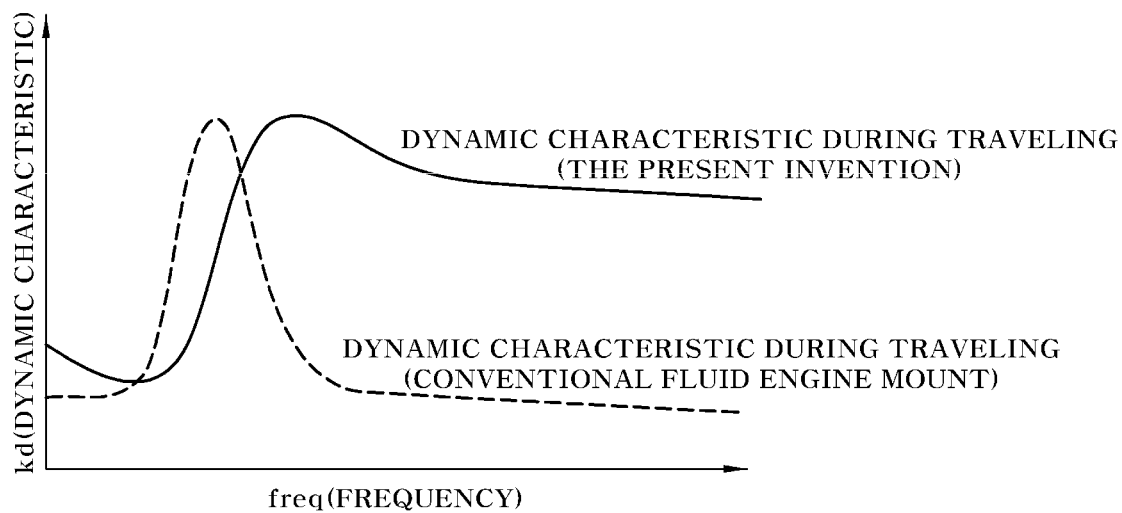
FIG. 8 is a graph illustrating the dynamic characteristic of the engine mount according to the exemplary embodiment of the present disclosure in the damping operation during traveling.

FIGS. 6 and 7 are fragmentary enlarged cross-sectional views illustrating the damping operation of the engine mount according to the exemplary embodiment of the present disclosure during traveling. FIG. 8 is a graph illustrating the dynamic characteristic of the engine mount according to the exemplary embodiment of the present disclosure in the damping operation during traveling.

When a substantial amount of vibration due to being driven on a rough road (e.g., uneven road surface) is applied to the engine mount, the fluid in the upper fluid chamber 101 may be introduced into the fluid chamber 103 through the fluid passage aperture 52 and the fluid action aperture 54 in the upper plate 50 and may act on the upper surface of the membrane part 62 of the integral plate 60 while the main rubber 20 is compressed. Consequently, the membrane part 62 may be displaced downwards (e.g., 1 mm or more), and the lower projecting end 62-2 may be fitted into the air aperture 71, thereby closing the air aperture 71, as illustrated in FIG. 6.

At the same time, the fluid in the upper fluid chamber 101 may be introduced into the lower fluid chamber 102 through the orifice body 40 for damping for the substantial amount of (downward) vibration, as illustrated in FIG. 6. In other words, since the fluid in the upper fluid chamber 101 flows along the main flow path 42 in the orifice body 40 through the fluid passage aperture 52 in the upper plate 50, and is introduced into the lower fluid chamber 102 through the communication aperture 44 in the orifice body 40, damping of the substantial amount of (downward) vibration may be implemented.

Meanwhile, the fluid in the lower fluid chamber 102 may be introduced into the upper fluid chamber 101 through the orifice body 40 for damping the substantial amount of (upward) vibration, as illustrated in FIG. 7. In other words, since the fluid in the lower fluid chamber 102 flows along the main flow path 42 in the orifice body 40 through the communication aperture 44, and is introduced into the upper fluid chamber 101 through the fluid passage aperture 52 in the upper plate 50, the damping of the substantial amount of (upward) vibration may be implemented.

Particularly, the engine mount according to the exemplary embodiment of the present disclosure during traveling on a rough road (e.g., a substantial amount of vibration) exhibits a dynamic characteristic equal to or superior to that of a conventional fluid engine mount, as shown in the graph of FIG. 8. Furthermore, when a substantial amount of (upward) vibration is applied to the engine mount, the membrane part 62 may be displaced upwards (e.g., 1 mm or more), and the upper projecting end 62-1 may be fitted into the first fluid action aperture 54-1 in the upper plate 50 and thus may be stopped, as illustrated in FIG. 7.

Figure 9:
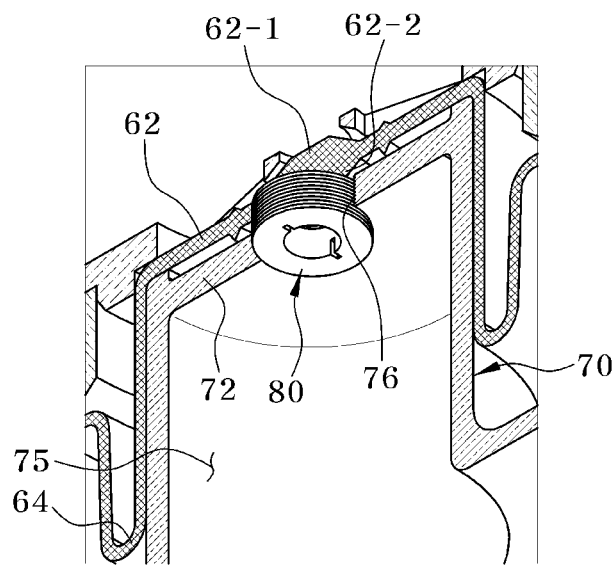
FIG. 9 is a fragmentary enlarged view illustrating the lower cover body of an engine mount according to another exemplary embodiment of the present disclosure to which a hollow screw for adjusting the vertical displacement of the membrane part is mounted.

Accordingly, when the substantial amount of vibration is applied to the engine mount, the vertical displacement of the membrane part 62 of the integral plate 60 may be limited more easily, and fluid communication between the upper fluid chamber 101 and the lower fluid chamber 102 is allowed, thereby offering an effect of strongly damping the substantial amount of vibration. According to another exemplary embodiment of the present disclosure, the air aperture 71 formed through the membrane support plate 72 of the lower cover body 70 may be modified into a female threaded aperture, and a hollow screw 80 for adjusting the vertical displacement of the membrane part 62 of the integral plate 60 may be threadedly fitted into the female threaded aperture 76, as illustrated in FIGS. 9 and 10.

Figure 10:
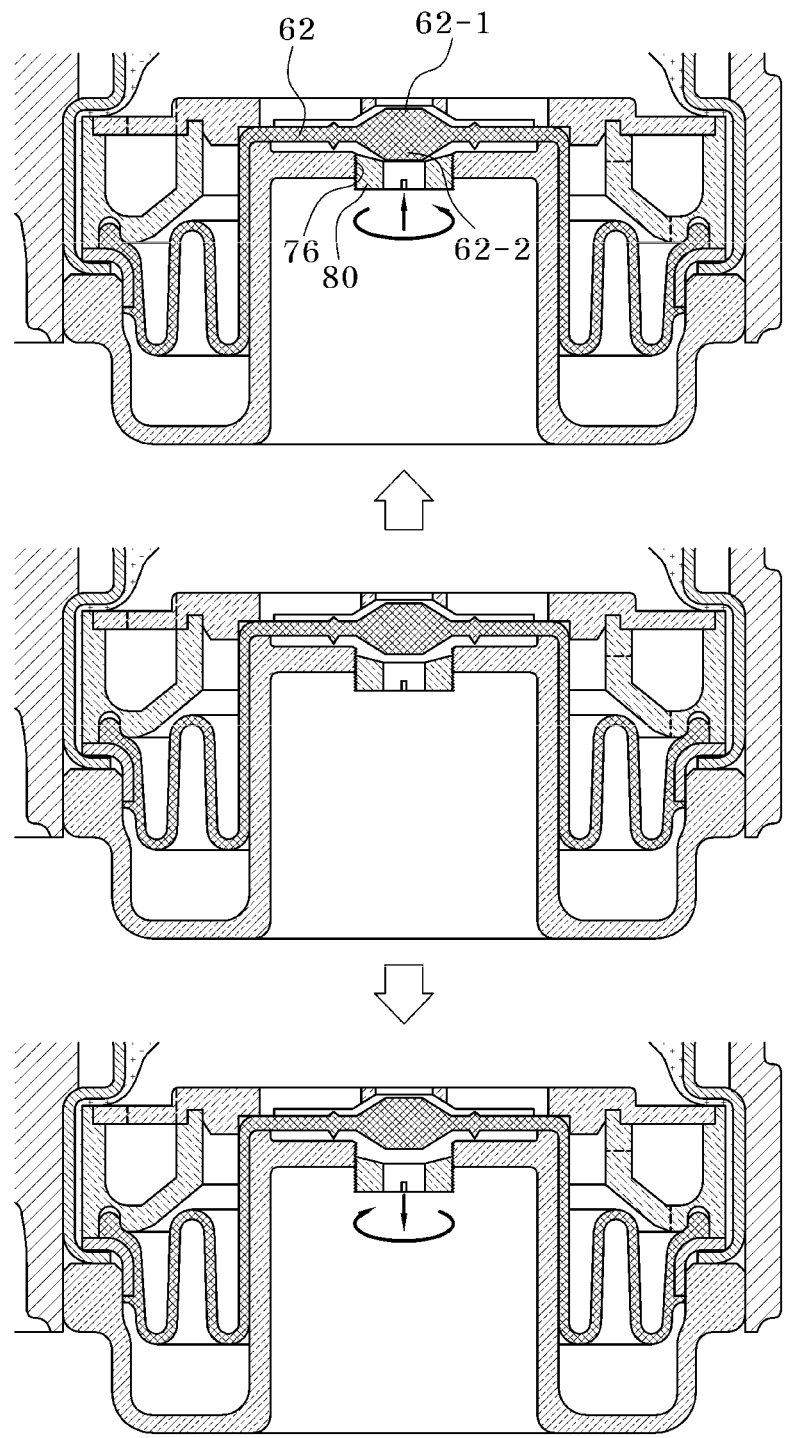
FIG. 10 is a fragmentary and enlarged cross-sectional view illustrating the hollow screw for adjusting the vertical displacement of the membrane part shown in FIG. 9, which is tightened and loosened according to an exemplary embodiment of the present disclosure.

As illustrated in FIG. 10, when the hollow screw 80 is tightened, the vertical distance between the hollow screw 80 and the lower projecting end 62-2 of the membrane part 62 is reduced, and the vertical displacement of the membrane part 62 may thus be reduced. In contrast, when the hollow screw 80 is loosened, the vertical distance between the hollow screw 80 and the lower projecting end 62-2 of the membrane part 62 is increased, and the vertical displacement of the membrane part 62 may thus be increased. Accordingly, by adjusting the vertical displacement of the membrane part 62, it may be possible to control or adjust the dynamic characteristic of the membrane part 62 for absorption of micro vibration and the dynamic characteristic of the membrane part 62 for absorption of a substantial amount of vibration depending on the type of vehicle.

Figure 11A:
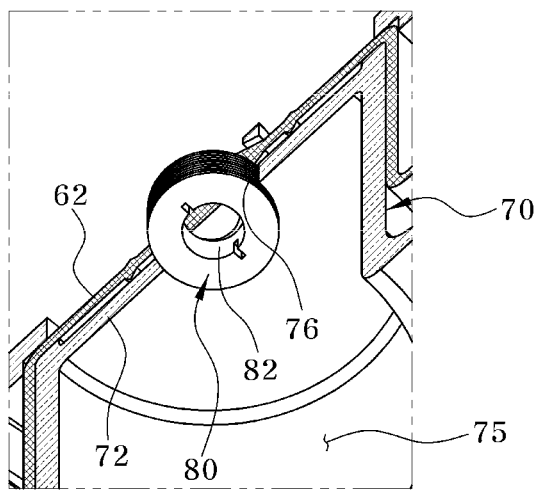
FIGS. 11A-11B are fragmentary enlarged perspective views illustrating the hollow screws of the engine mount of the exemplary embodiment of the present disclosure, inside diameters of which have different sizes.
Figure 11B:
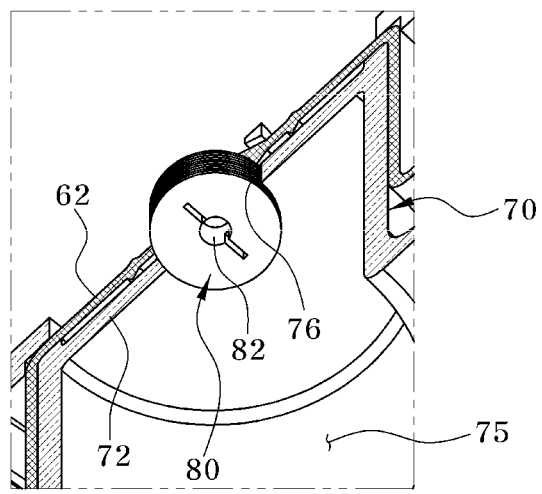

As illustrated in FIGS. 11A-11B, it may be possible to tune the dynamic characteristic of the membrane part 62 based on the type of vehicle by adjusting the size of the aperture 82 formed in the center of the hollow screw 80. Specifically, when the size of aperture 82 in the hollow screw 80 is reduced, it may be possible to tune the dynamic characteristic of the membrane part 62 to a damping extent suitable for absorption of vibration during traveling, as illustrated in FIG. 11B. In contrast, when the size of aperture 82 in the hollow screw 80 is increased, it may be possible to tune the dynamic characteristic of the membrane part 62 to a damping extent suitable for absorption of vibration during idling, as illustrated in FIG. 11A.

Figure 12:
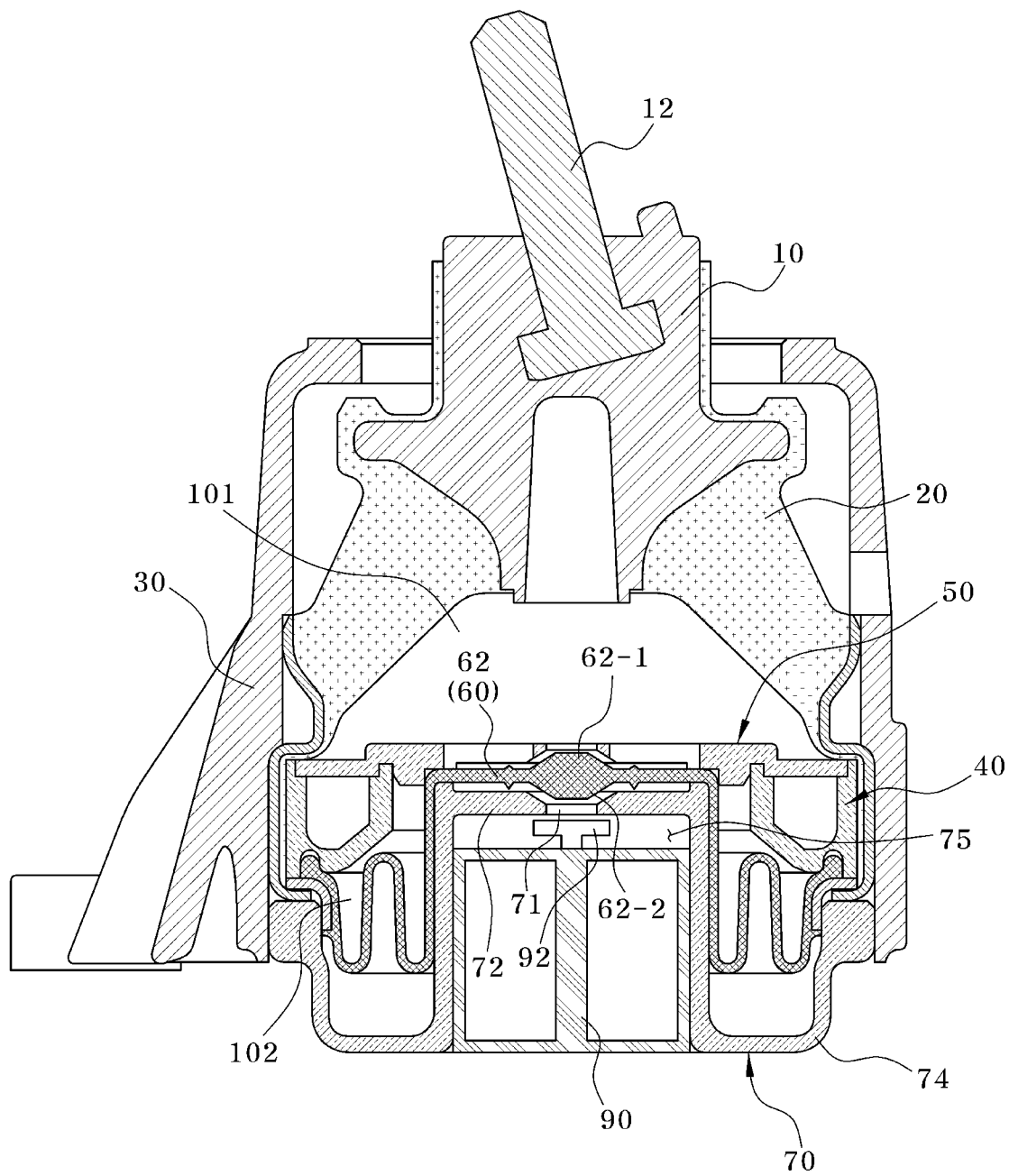
FIG. 12 is a cross-sectional view illustrating the engine mount according to the embodiment of the present disclosure in which a solenoid valve is provided at a lower portion of the lower cover body of the engine mount according to the exemplary embodiment of the present disclosure.

According to a further exemplary embodiment of the present disclosure, a solenoid valve 90 for opening and closing the air aperture 71 may be provided in the hollow cavity 75 defined by the membrane support plate 72 of the lower cover body 70 and the cover 74, as illustrated in FIG. 12. Consequently, by adjusting the timing and the period for blocking of the air aperture 71 using the blocking rod 92, which is raised or lowered by actuation of the solenoid valve 90, the dynamic characteristics of the membrane part 62 of the integral plate 60 may be controlled or adjusted according to the traveling conditions and the driving condition of a vehicle.

By virtue of the above-described constructions, the present disclosure offers the following effects.

First, since the integral plate having the membrane part and the diaphragm part, both of which are essential components of an engine mount, is applied, it may be possible to reduce manufacturing costs, weight, the number of components and manufacturing labor, and it may be possible to prevent leakage of fluid, compared to the case in which the membrane part and the diaphragm part are prepared separately and assembled with each other.

Second, since the dynamic characteristic of the membrane part of the integral plate is switched in a self-switchable manner based on whether a vehicle is idling or traveling (e.g. being driven), it may be possible to more easily fulfill a damping function of the engine mount for isolating vibration occurring at a powertrain during idling or for controlling the behavior of the powertrain during traveling.

Third, since the vertical displacement of the membrane part of the integral plate is adjusted using the hollow screw, it may be possible to tune the dynamic characteristic to be suitable for absorption of vibration by the engine mount.

Fourth, it may be possible to tune the dynamic characteristic to be suitable for absorption of vibration of the engine mount by selecting the inside diameter of the hollow screw depending on the type of vehicle.

Fifth, since the solenoid valve may be further provided in the lower cover body, which defines the air chamber together with the membrane part of the integral plate such that the solenoid valve opens or closes the air aperture in the lower cover body depending on the traveling conditions, it may be possible to tune the dynamic characteristic of the membrane part depending on the traveling conditions.

The disclosure has been described in detail with reference to exemplary embodiments thereof. However, it will be appreciated by those skilled in the art that changes may be made in these exemplary embodiments without departing from the principles and spirit of the disclosure, the scope of which is defined in the appended claims and their equivalents.

What is claimed is:

1. An engine mount for a vehicle, comprising:
a core bush to be assembled with a vehicle body;
a main rubber formed on an outer surface of the core bush;
an outer pipe attached to an outer surface of the main rubber and extending downwards;
an orifice body mounted on an inner surface of the outer pipe and having a main flow path for communication of fluid between an upper fluid chamber and a lower fluid chamber;
an upper plate coupled to an upper portion of the orifice body, the upper plate having a fluid passage aperture formed in an outer peripheral portion thereof to communicate with the main flow path and having a plurality of fluid action apertures formed in a center region thereof;
an integral plate including a membrane part, disposed under the center region of the upper plate to be displaced vertically, and a diaphragm part, coupled to an edge of a lower surface of the orifice body to be positioned under the orifice body and integrally formed with the membrane part; and
a lower cover body including a membrane support plate having an air aperture formed there through and disposed under the membrane part to be spaced apart therefrom, and a cover that supports a lower portion of the diaphragm part and is integrally formed with the membrane support plate,
wherein the air aperture formed in the membrane support plate of the lower cover body is a female threaded aperture, and a hollow screw for adjusting a vertical displacement of the membrane part is threadedly coupled to the female threaded aperture.

2. The engine mount of claim 1, wherein the upper fluid chamber is defined as a space between the main rubber and the upper plate, and the lower fluid chamber is defined as a space between the orifice body and the diaphragm part.

3. The engine mount of claim 1, wherein a space between an upper surface of the membrane part of the integral plate and a lower surface of the upper plate provides a fluid chamber, into which fluid in the upper fluid chamber is introduced and from which the fluid is discharged to the upper fluid chamber, and a space between a lower surface of the membrane part and an upper surface of the membrane support plate of the lower cover body provides an air chamber, into which external air is introduced and from which the external air is discharged to an outside.

4. The engine mount of claim 1, wherein the fluid action aperture includes a first circular fluid action aperture formed in a center of the upper plate, and a plurality of second fluid action apertures arranged radially around the first fluid action aperture.

5. The engine mount of claim 1, wherein the integral plate is integrally disposed at upper and lower surfaces of a center thereof with an upper projecting end and a lower projecting end, respectively, to limit a vertical displacement of the membrane part.

6. The engine mount of claim 5, wherein the upper projecting end is fitted into the first fluid action aperture in the upper plate to close the first fluid action aperture when the membrane part is displaced upwards, and the lower projecting end is fitted into the air aperture in the membrane support plate of the lower cover body to close the air aperture when the membrane part is displaced downwards.

7. The engine mount of claim 6, wherein each of the upper projecting end and the first fluid action aperture has a trapezoidal cross section, which gradually decreases upwards, and each of the lower projecting end and the air aperture has a trapezoidal cross section, which gradually decreases downwards.

8. The engine mount of claim 1, wherein the membrane support plate of the lower cover body includes at an edge of an upper surface thereof with a sealing end, which is in sealable contact with an edge of a lower surface of the membrane part to prevent fluid leakage.

9. The engine mount of claim 1, wherein the orifice body includes a coupling groove formed in a lower portion thereof, and the diaphragm part of the integral plate includes a coupling protrusion formed at a peripheral portion thereof, which is fitted into the coupling groove.

10. The engine mount of claim 9, wherein the peripheral portion of the diaphragm part includes at an outer surface thereof with a rigidity-reinforcing plate attached thereto to reinforce rigidity of the diaphragm part.

11. The engine mount of claim 1, wherein a dynamic characteristic of the membrane part is tuned by increasing or decreasing a size of the aperture in the hollow screw.

12. The engine mount of claim 1, further comprising a solenoid valve disposed in a space defined by the membrane support plate of the lower cover body and the cover to open and close the air aperture.

* * * * *